(No Model.)
J. H. McGOWAN.
VALVE SEAT.
No. 486,600. Patented Nov. 22, 1892.
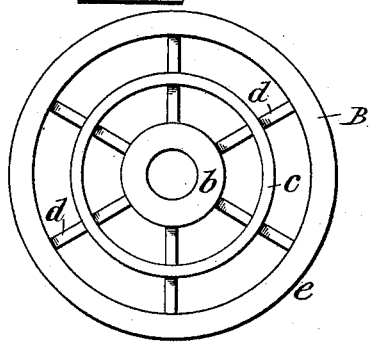
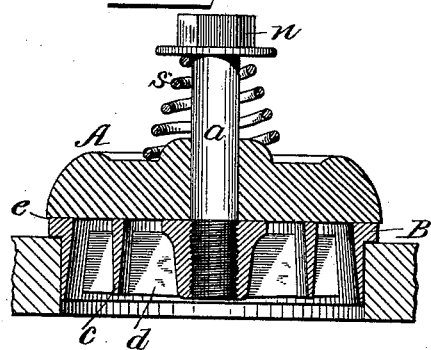
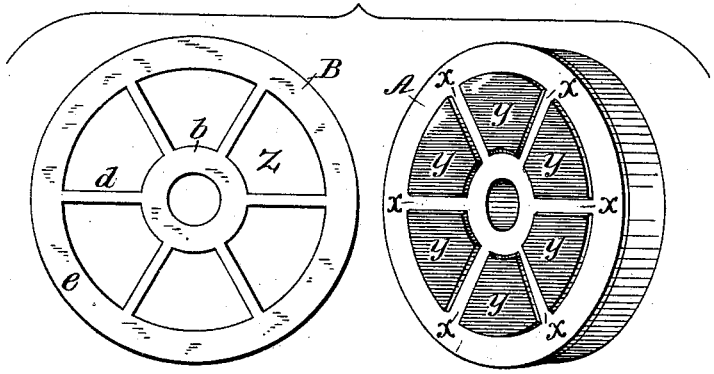
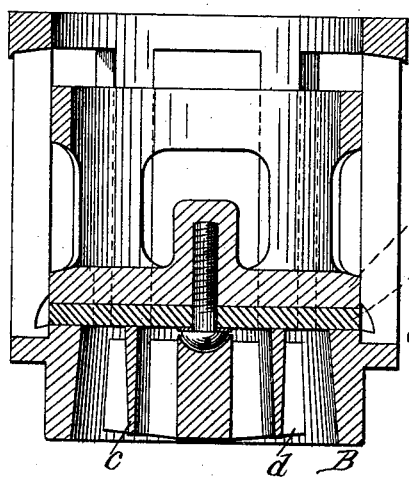
Witnesses:
W. C. Jirdinston.
E. Hosea.
Inventor
John H. McGowan
by R. O. Hosea
Attorney.

UNITED STATES PATENT OFFICE.

JOHN H. McGOWAN, OF CINCINNATI, OHIO.

VALVE-SEAT.

SPECIFICATION forming part of Letters Patent No. 486,600, dated November 22, 1892.

Application filed December 21, 1891. Serial No. 415,786. (No model.)

*To all whom it may concern:*

Be it known that I, JOHN H. McGOWAN, a citizen of the United States, residing at Cincinnati, Ohio, have invented new and useful Improvements in Valve-Seats, of which the following is a specification.

My invention relates to the class of flat-disk check-valves employed in pumping mechanism seating upon the flat marginal surface of the valve-port in a plane at right angles with the axis of the port. Such valves are usually guided by a central stem held in a "spider" secured across the valve-aperture. As the function of such spider is merely to sustain a central boss, from which the guide-stem projects upwardly, the construction involves radial wings connecting and merging into the central boss and the bounding wall of the cylindrical aperture. In some cases a "cage" valve is employed, the valve being cup-shaped and guided in a concentric series of ribs prolonged upward parallel with the cylindrical plane of the valve-aperture. Such valves have no central guide-stem, and consequently the valve-seat aperture is entirely open and unobstructed.

My invention has more particular reference to these two classes of valves.

In more recent practice, in order to avoid the "clacking" noise, (whence the original name of such valves was derived,) the first-described valves are wholly made of hard rubber faced with a softer layer of the same material, and the latter class are of metal, to the seating-face of which a layer of rubber is secured.

In the first-named valves, guided upon a central stem, the radial wings acquire a new function—namely, that of furnishing a support for the flat disk, which, without such intervening support at the center and thence to the circumference, would be depressed or crushed centrally by the superincumbent pressure. This is especially the case in pumps working under heavy pressure, (where this construction and material are chiefly used,) and the tendency is much increased when, as in boiler-feeders, &c., warm or hot water is pumped, owing to the softening effect of heat on material of the nature referred to. By repeated pressure under these conditions those portions of the rubber facing lying upon the marginal seat, central boss, and radial support soon become compacted and depressed, while the intervening portions become correspondingly raised, as illustrated in the drawings hereinafter referred to, so that the valve-face becomes a matrix, in which the surface contour of the spider is more or less deeply impressed, the radial depressions $x$, corresponding with the wings $d$, being separated by ridges $y$, corresponding with the water-openings $z$, between the wings projecting beyond the proper face. So long as the valve might maintain its original radial position in relalation to the spider this would present no difficulty; but as it is not desirable to employ a feather-and-slot construction or other device to maintain such radial relation upon its guide-stem, because of increased friction and consequent liability of the valve to "stick," the original position is not preserved. The swirling of water in its passages through the valve-seat and the "jumping" of the valve under pressure often displace the valve, so that its ridges rest upon the radial wings and the valve becomes leaky and inefficient. When priming occurs or air leaks into the passages, the pump often refuses to work and it becomes necessary to cease operations, open the valve-casing, and restore the valves to their proper position with a liability to similar displacement immediately or at any time.

The second-described class of valves are subject when faced with a yielding material to a further danger—namely, it is impracticable to so unite the facing-layer of yielding material with the metal of the valve itself as to prevent the interposition of the water, which soon separates the two and by its pressure misshapes and destroys the facing-layer, so that the valves become inoperative and useless.

The object of my invention is to provide a remedy for both the defective conditions above described; and it consists in a valve-seat wherein are formed one or more concentric supporting-faces interposed between its central axis and the marginal seat proper, the supporting-surfaces being in or approximately in a common plane with the marginal seat, and in the combination therewith of a flat disk valve composed of or faced with rubber or other comparatively-yielding material and free to rotate upon said seat. I dispense with the radial wings as supports for the valve and employ them in modified form and position only to support the concentric wings whose upper faces furnish a support for the valves.

Mechanism embodying my invention is illustrated in the accompanying drawings, in which—

Figure 1 is a plan of my improved valve-seat, showing one concentric supporting-ring interposed between the central boss and marginal valve-seat. Fig. 2 is an axial section of my improved valve-seat with the valve seated thereon; Fig. 3, a plan view of the old style of valve-seat, with a corresponding perspective bottom view of the valve lifted therefrom, showing the radial depressions and ridges, illustrating one of the defective conditions which my invention is designed to overcome; and Fig. 4, an axial section of a cage-valve and seat, showing my improvement applied thereto in relation to a valve faced with a rubber layer.

Referring now to the drawings, A designates a flat disk-valve, of hard rubber, of the class first herein described, centrally pierced to rise and fall upon the guide-stem $a$, and B designates the valve-seat provided with a central boss $b$, one or more concentric rings $c$, and two or more radial supporting-wings $d$. The stem $a$ usually carries a spiral spring $s$, held by a nut or head $n$ at the upper end of the stem and bearing against the top of the valve A to assist in holding it to its seat upon the marginal surface $e$ of the valve-port. The concentric rings $c$ and the central boss $b$ have their upper faces in a common plane, or approximately so, with the marginal valve-seat $e$, the face of the central boss $b$ being practically a seat in relation to the central opening of the valve to prevent leakage at that point. The ribs $d$, not being required as direct supports for the valve, are dropped down below the general level sufficiently to clear any possible supporting-contact with the valve. It will be seen that as thus constructed the compacting effect of pressure and heat will produce concentric depressions in the valve-face and corresponding concentric ridges which do not limit the valve to any radial position, whereby it maintains a true seat under all circumstances. I introduce a similar construction in cage-valve seats, as shown in Fig. 4, where a disk-valve is faced with a layer $f$ of rubber. The construction being otherwise such as I have already described need not be further detailed. The number of concentric supports $c$ will be governed by the size of the valve-seat openings, the degree of pressure and other obvious conditions requiring no detailed reference.

I claim as my invention and desire to secure by Letters Patent of the United States—

1. A valve-seat for disk lift-valves provided with a central boss for a guide-stem and one or more concentric supporting-rings within the port-openings, having their supporting-faces in or approximately in the plane of the boss and marginal seat and being themselves sustained by supports wholly below said plane, substantially as set forth.

2. In combination with a flat disk valve composed of or faced with rubber or other yielding material, a seat provided with one or more concentric supporting-rings arranged within the annular seat-opening with their supporting-faces in or approximately in the plane of the boss and marginal seat and being themselves sustained by supports wholly below said plane, substantially as set forth.

In testimony whereof I have hereunto set my hand in the presence of two subscribing witnesses.

JOHN H. McGOWAN.

Witnesses:
L. M. HOSEA,
E. HOSEA.